United States Patent [19]

Müller

[11] 4,069,103
[45] Jan. 17, 1978

[54] PROCESS FOR RECOVERING DEXTROSE AND DEXTRINS FROM PROTEIN-CONTAINING STARCH PRODUCTS

[76] Inventor: Hans Müller, im Allmendli, 8703 Erlenbach, Switzerland

[21] Appl. No.: 678,710

[22] Filed: Apr. 20, 1976

[30] Foreign Application Priority Data

| Apr. 28, 1975 | Switzerland | 5531/75 |
| May 7, 1975 | Switzerland | 6086/75 |
| May 27, 1975 | Switzerland | 6880/75 |
| May 28, 1975 | Switzerland | 6947/75 |

[51] Int. Cl.² .............. C12D 13/04; C12D 13/06; C13K 1/08; C13L 1/10
[52] U.S. Cl. .................... 195/4; 195/11; 195/31 R; 127/1; 127/40; 127/54; 426/53
[58] Field of Search .......... 127/40, 54; 195/31 R, 195/31 F, 4, 11; 426/53

[56] References Cited

U.S. PATENT DOCUMENTS

| 2,307,725 | 1/1943 | Daly | 127/40 X |
| 2,410,264 | 10/1946 | Brock | 127/54 X |
| 2,571,541 | 10/1951 | Cleland | 127/40 |
| 2,583,684 | 1/1952 | Christensen | 195/4 |
| 2,698,825 | 1/1955 | Frankel | 195/4 |
| 2,797,176 | 6/1957 | Gottfried | 127/40 |
| 3,228,876 | 1/1966 | Mahon | 127/54 X |
| 3,276,908 | 10/1966 | Idaszak | 127/40 |
| 3,305,395 | 2/1967 | Scallet | 127/40 X |
| 3,342,729 | 9/1967 | Strand | 127/54 X |
| 3,383,245 | 5/1968 | Scallet | 127/40 X |
| 3,668,007 | 6/1972 | Egger | 127/54 X |
| 3,720,583 | 3/1973 | Fisher | 195/31 R |
| 3,756,853 | 9/1973 | Meyer | 127/54 X |
| 3,788,945 | 1/1974 | Thompson | 195/31 F |
| 3,958,015 | 5/1976 | Gay | 426/53 X |

Primary Examiner—Sidney Marantz
Attorney, Agent, or Firm—Michael J. Striker

[57] ABSTRACT

Dextrose and dextrins are obtained from protein-containing starch products by subjecting the starch product to an incomplete or complete acid or enzymatic hydrolysis or a combination of both types of hydrolysis and then circulating the hydrolysate containing a low viscosity sugar solution and water-soluble high molecular proteins through an ultrafilter to separate the proteins from the sugar solution whereupon the dextrose or, in case of incomplete hydrolysis, the dextrins are recovered from the filtrate obtained in the ultrafilter.

12 Claims, 5 Drawing Figures

PROCESS FOR RECOVERING DEXTROSE AND DEXTRINS FROM PROTEIN-CONTAINING STARCH PRODUCTS

BACKGROUND OF THE INVENTION

The invention relates to a process for obtaining dextrose and dextrins from protein-containing starches.

The starting product constituting the starch is preferably a vegetable product such as potatoes, arrowroot or manioc (cassava) as well as grain feeds such as maize, sorghum, wheat, rice, rye or barley.

The complete hydrolysis of starch leads to dextrose. At present, principally two processes are in use for making dextrose from starch. One of the processes employs a pure acid hydrolysis. The other moves through a two-stage acid-enzyme process or a two-stage enzyme-enzyme process.

From the German published application No. 1,567,365 a process for making starch hydrolisates is known. In this case a syrup is obtained of a low dextrose value. The hydrolysis is effected in a two-step process with alpha-amylase.

A process for extracting starch from maize grit and the subsequent enzymatic saccharification is described by K. Kroyer in the publication Die Sterke, 10, 312 (1966).

In the German published application 2,417,639 a process is disclosed for liquefying corn starch. The starch there is mixed with water, a bacterial alpha-amylase and glucoamylase and is then processed at elevated temperatures. The German published application No. 1,717,126 likewise deals with a process for liquefying starch.

The shortcoming of all these prior art processes is that it is necessary to wash out to the extent possible all water-soluble components of the starch by swelling or elutriation with water in order to obtain a pure starch for the enzymatic hydrolysis and the recovery of a pure dextrose. This purification step causes substantial difficulties, particularly in case of wheat, rye and barley because of the grain size which is small compared with potatoe starch or corn starch and because of byproducts from the precipitation. A filtration in the classic sense of the word is not possible since what is involved is the separation of a solid from solids and a liquid.

In addition to the difficulties in obtaining a pure starch, further problems arise during the hydrolysis of the starch because of the unavoidable formation of byproducts during the degradation.

It is therefore an object of the present invention to provide for a process of obtaining dextrose and dextrins from protein-containing starches, for instance by enzymatic hydrolysis without requiring to use a pure starch as the starting product for the enzyme treatment.

Another object of the invention is to provide for a process whereby the main hydrolysis products, that is dextrose and dextrins can easily be separated from the protein and other accompanying substances.

SUMMARY OF THE INVENTION

These objects are accomplished by subjecting the initial starch product to an acid or enzymatic hydrolysis or a combination of both types of hydrolysis, then circulating the hydrolyzate containing a low viscosity sugar solution and water-soluble high molecular proteins through an ultrafilter to separate the proteins from the sugar solution and recovering the dextrose or, in case of an incomplete hydrolysis, the dextrins from the filtrate obtained in the ultrafilter.

DISCUSSION OF THE INVENTION AND OF PREFERRED EMBODIMENTS

Figure 1:
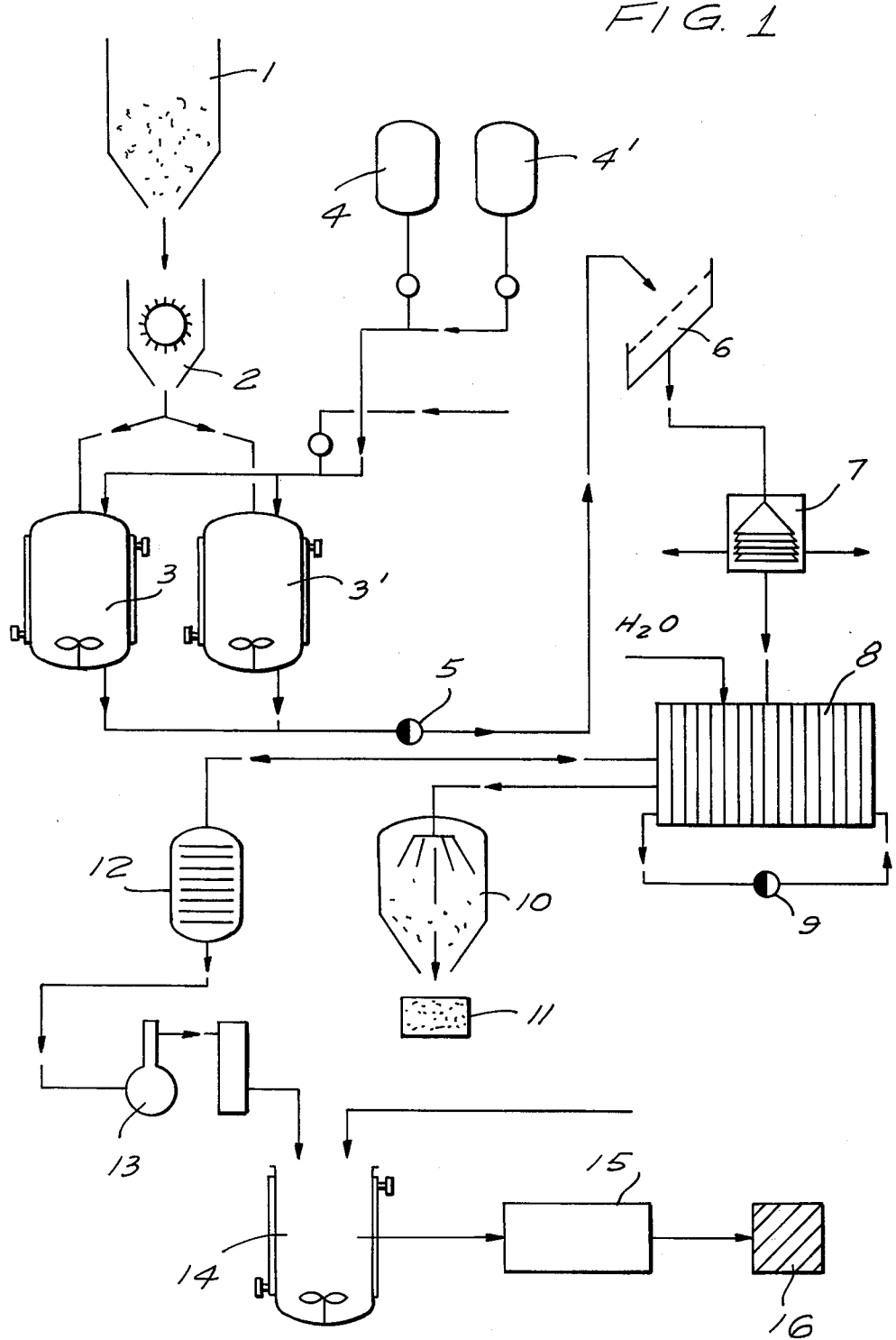
FIG. 1 is a flow sheet showing in diagrammatic form a process for obtaining dextrose and further obtaining isomerose from the dextrose.

As has already been brought out, the advantage of the present process is that it is not necessary to start with pure starch. Rather, the hydrolysis can be carried out in conventional form immediately after the wet grinding and dilution of the ground initial material. Following the hydrolysis the dextrose formed therein or, if the hydrolysis is only partly carried through, the dextrins are separated as such by means of ultrafiltration.

The dextrose may be obtained as such in the form of pure dextrose. However, it can also be used without any preceding refining step to make isomerose therefrom.

An additional advantage of the ultrafiltration is the recovery of pure protein from the concentrate of the ultrafiltration. This pure protein constitutes a first class food product for human consumption.

Apart from the recovery of dextrose and dextrins, the obtaining of protein from protein-containing starches is of substantial interest for instance as a substitute for chicken albumin, for instance in the bakery industry.

During the hydrolysis of the protein-containing starches, such as, cereals and legumes, insoluble protein is obtained in addition to the water-soluble protein. The soluble portions are subject to strong foaming in an aqueous solution and can particularly be used as substitutes for chicken albumin. The water insoluble proteins which contain fibrous contaminations are filtered off by means of a coarse filter prior to the ultrafiltration or are separated by means of a centrifuge. They can then be used as animal feed With reference to the flow sheets and in particular those of FIG. 1, it will be seen that the swollen grains of maize received from the bunker 1 are subjected to a coarse and fine grinding mill 2 (this symbol standing for both types of mills) and preferably to a wet grinding, and are then passed into the stirrer tanks 3 and 3'. The mass is there subjected to an acid or enzymatic hydrolysis. Preferably there is carried out a hydrolysis successively with two different enzymes obtained from the containers 4 and 4' such as alpha amylase and amyloglucosidase. The hydrolysis may be carried out with the first enzyme at a temperature of 70° to 80° C and with the second enzyme at a temperature of 50° to 60° C. The pH during the hydrolysis may be adjusted by addition of acid to a range between 3.5 and 4. The time of the hydrolysis may be between 10 and 72 hours depending on the type of raw material and the presence of calcium chloride.

After completion of the hydrolysis the entire solution is passed by means of a pump 5 onto a strainer 6 where the cereal husks and similar hard materials are removed.

The mass then passes to a separator 7 where the fatty components including the corn oil are eliminated. Likewise, the precipitate, that is water insoluble proteins such as zein, are removed from the remaining sugar-containing low viscosity phase. This separator may for instance be in the form of a centrifuge.

The separation of the water soluble high molecular proteins from the dextrose and the lower molecular dextrins is then effected in the ultrafilter 8. The low viscosity phase may for instance be circulated through the ultrafilter for a time from 15 to 20 hours at a temperature of 20° to 50° C and a pressure of 2 to 6 bar. The circulation in the ultrafilter is effected by a rotary pump 9. The ultrafiltration may be carried out at a pH in the range between 3 and 9. Preferably, the material is washed during the ultrafiltration with relatively small amounts of water for a time sufficient to cause the concentrate which is obtained from the retenate to have a concentration of at least 70 to 80% protein as dry solids. This is accomplished by passing the retenate to a spray dryer 10 whereupon the protein can be discharged into a packaging material 11.

The sugar solution on the other hand which constitutes the permeate resulting in the ultrafiltration, is passed through a bleaching column 12 which for instance may be an ion exchange column and it may also additionally be treated with activated charcoal. If desired, it may also be subjected to a desalting step. The decolorized, that is bleached solution, is then subjected to concentration in an evaporator 13. If a glucose syrup is to be obtained at this place the concentration is effected to an 85% dry contents.

If it is desired to obtain isomerose, the concentration is carried out only to a dry contents of 40%. The concentrate is in the form of a syrup which may then be treated with, for instance magnesium sulfate and cobalt sulfate and glucose isomerase at a pH for instance between 6.6 and 7.5 and a temperature for instance of 60° C.

The syrup may then be subjected to a purification at 15 which for instance can be effected by a cation-anion exchange compound and a subsequent treatment with activated coal. The product is then discharged into the container 16 as an isomerose syrup or sugar.

Figure 2:
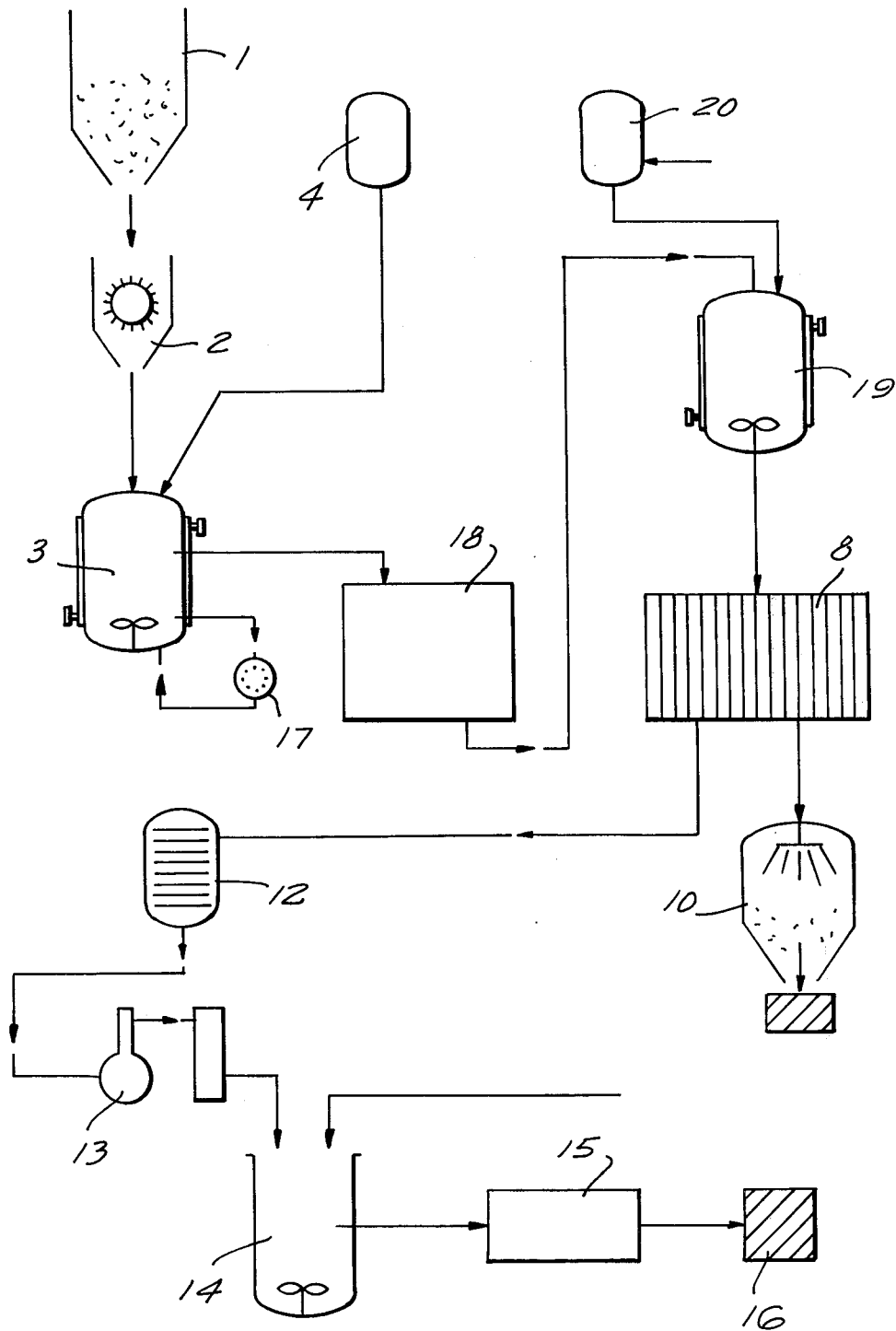
FIG. 2 is a flow sheet illustrating a modification of the process shown in FIG. 1.

The drawing in FIG. 2 shows a modification of the process for obtaining isomerose from cereals via an intermediate product in the form of dextrose.

If not otherwise indicated, the symbols have the same meaning as in FIG. 1. The product which is pretreated in the mill 2 in the same manner as in FIG. 1 is subjected to a treatment with an amylase in the stirring container 3. The enzyme is obtained from the container 4. Prior to adding the enzyme the contents of the container 3 are subjected to a homogenization in the homogenizer 17 for such time until the desired small particle size has been obtained. After carrying out the hydrolysis in the same manner as in FIG. 1, the now liquefied starch is passed to a separator 18 which may be in the form of a centrifuge or filter in order to eliminate the water insoluble proteins. The remaining low viscosity phase then is passed into a second reactor 19 where it is reacted with amyloglycosidase received from the container 20. Thus, the solution is degraded to obtain dextrose. After the degradation the solution is separated in the ultrafilter 8 into a protein concentrate and pure dextrose. The protein concentrate is then dried in the spray dryer 10. The dextrose containing permeate is further processed to obtain isomerose in the same manner as shown in FIG. 1.

Figure 3:
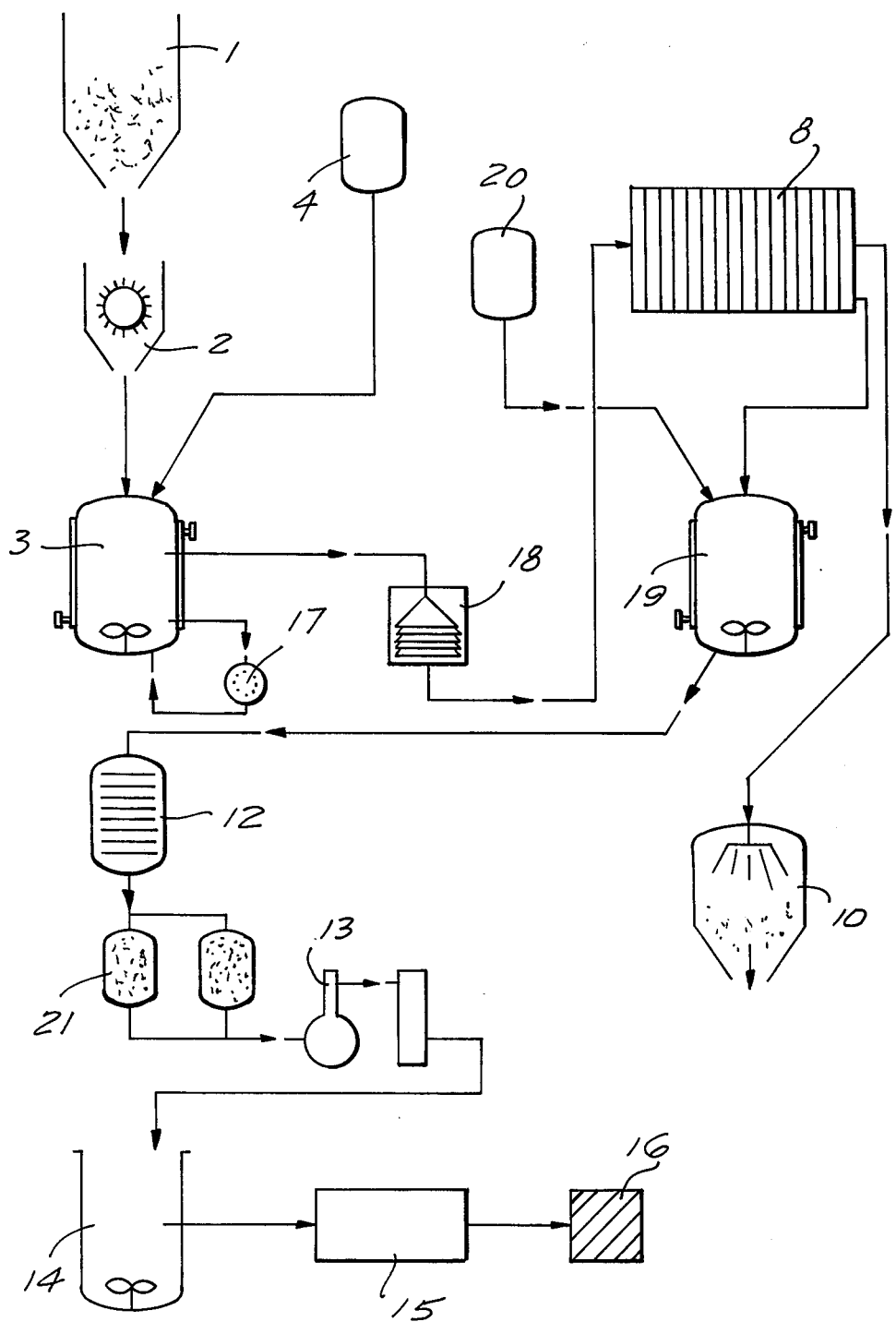
FIG. 3 is a flow sheet disclosing another modification of the process of FIG. 1.

FIG. 3 illustrates another modification of the processes shown in FIG. 1 and FIG. 2. If not otherwise indicated the reference letters again have the same meaning.

The separation of the first enzyme solution which is formed in the same manner as shown in FIG. 2 is effected in a centrifuge 18. By this centrifuge the residues and (water insoluble) proteins are removed. The solution is then directly passed into the ultrafiltration. In the ultrafilter the soluble protein is concentrated and is then passed to a spray dryer 10 in order to obtain water soluble protein concentrate. The permeate formed in the ultrafilter 8 is, however, passed into a second enzyme reactor 19 and is there treated with amyloglycosidase received from the container 20. There is thus obtained a glucose solution which then is subjected to a bleaching in the column 12 and is desalted in an ion-exchanger 21. The further processing by means of isomerase is effected in the same manner as shown in FIGS. 1 and 2.

Figure 4:
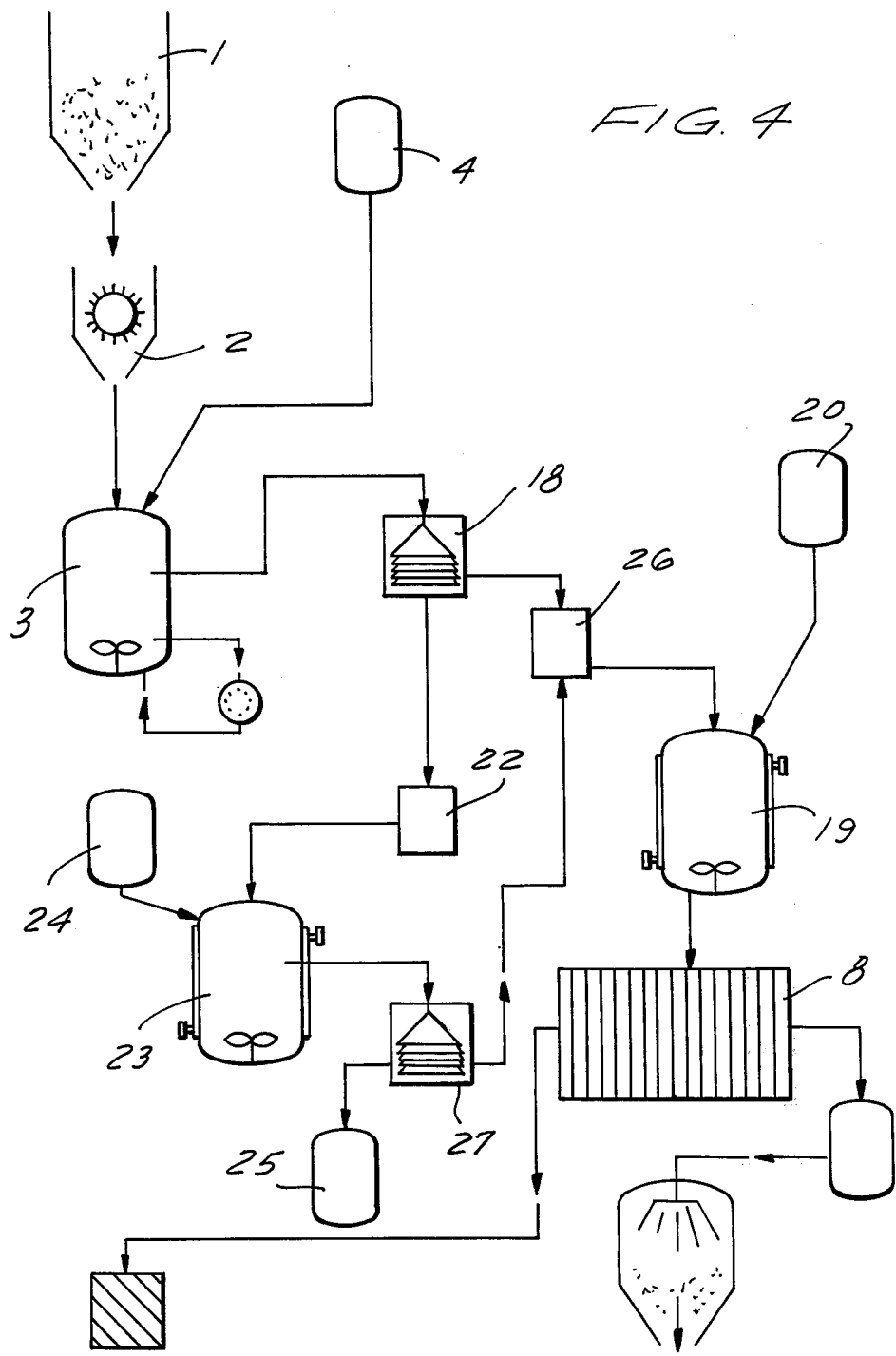
FIG. 4 is a flow sheet of a process for making dextrose only.

FIG. 4 shows a process for making dextrose. In the enzyme reactor 3 there is again formed a solution in the same manner as in FIG. 2. This solution is passed to a separator 18 where the residues and the liquid phase are separated. The residues are collected in a container 22 and are treated in a stirring vessel 23 with alkali received from the tank 24 so as to obtain a pH of 8 to 9. In this manner the remaining proteins are dissolved out of the comminuted husks. The thus formed suspension is then passed into a separator 27 where it is separatd into a protein-free residue and a protein containing solution. The protein-free residue is collected in a receptacle 25 and may then be further subjected to drying. The protein-containing solution is united with the solution received from the separator 18. The two solutions are subjected to a neutralizing step in the vessel 26. The neutralized total solution is then treated in the reactor 19 with amyloglycosidase received from the tank 20.

The further treatment of the reaction product is the same as shown and described in connection with FIG. 3.

Figure 5:
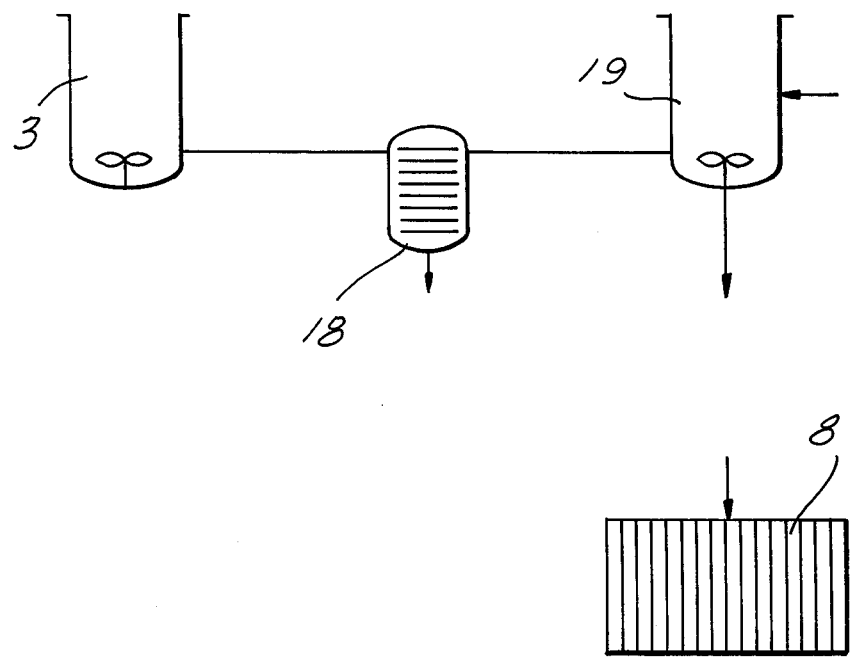
FIG. 5 is a flow sheet which illustrates another modification of the final processing steps.

FIG. 5 shows a detail of a further processing modification of the enzyme solution.

The suspension received from the enzyme reactor 3 is here subjected to a filtration in the filter vessel 18. The residue from the filtration is treated with sodium hydroxide and further processed as indicated in FIG. 4 (tank 23, separator 24 and neutralizing vessel 26). The filtrate from the filter 18 on the other hand is passed into a reactor 19 to receive a second enzyme treatment. During this treatment 76% of the total initial crude maize go into solution. The solution now contains the sugar and the soluble proteins. The neutralization then is effected together with the previously NaOH treated residue solution so as to obtain a pH of 3.5. Subsequently, the solution is passed to the ultrafilter 8 to separate the protein from the sugar solution. The further processing is effected as described in connection with the previous embodiments.

The following is a specific working example of a process carried out in accordance with the present invention.

EXAMPLE 100 kg of untreated maize of a 15% water contents are suspended in 900 l water and after addition of 0.1 to 0.2% alpha amylase, stirred at 70° to 80° C and subjected to homogenization. The pH is maintained at about 7. After 1 to 2 hours the mass is cooled down to 50° to 60° and is then reacted with a second enzyme, amyloglucosidase in an amount of likewise 0.1 to 0.2%.

The alpha amylase used in this case was a product identified as "HT1000 Miles Laboratories" while the amyloglucosidase was a "Diazyme L100 Miles Laboratories".

The adjustment of the pH to 3.5 to 4 was effected with dilute hydrochloric acid. The hydrolysis was carried out during a total period of 48 hours in the presence of calcium chloride (0.01 mol/l).

The protein-containing suspension was then passed to a vibration strainer which in the drawing of FIG. 1 is indicated at 6. There the yellow husk portions were removed. The suspension was also subjected to centrifuging to remove the fat components.

The amount of crude maize oil thus eliminated was about 2.950 to 3.000 kg per 100 kg maize of a 15% water contents.

The residue from the centrifuge indicated in FIG. 1 at 7 consisted of fibers and water insoluble (precipitated) proteins. The amount of this residue was 10 to 15 kg relative to 100 kg of maize of a 15% water contents.

The low viscosity phase containing the sugar and the water soluble proteins as received from the centrifuge was then subjected to ultrafiltration during 20 hours. The ultrafilter employed was the type Westinghouse Style No. Poly-184 Ser. No. 4-1197. It had tubings of 10 mm diameter and a length of 1200 mm. The filter surface was 0.68 m² with a total number of 18 tubings. The filtration was carried out at a differential pressure of about 5 bar and at a temperature of 35° C. In the ultrafilter the solution was separated into a glucose solution and a protein concentrate. During the ultrafiltration water was repeatedly added for washing.

Prior to drying, the protein concentrate contained 12 to 15% crude protein. The total yield of protein after drying was 0.5 to 1.0 kg protein relative to 100 kg of the untreated maize of 15% water contents. While this protein is a high value protein since it is water soluble, and when dried has a contents of 70 to 80% crude protein its amount is not large compared with the total amounts processed.

The permeate resulting from the ultrafiltration consisted predominantly of glucose-salt solution. It was bleached (decolorized) with activated charcoal. This step was not even absolutely necessary since the treatment with an ion-exchange resin already accomplished a sufficient decolorization.

The concentration then was effected in a three-stage vacuum evaporator in conventional form. The inlet temperature was about 100° C and the outlet temperature 45 to 50° C. If a glucose syrup was wanted the evaporation was carried out to obtain an 85% concentration dry substance.

For obtaining isomerose the concentration was carried out only to obtain a syrup of a 40% concentration dry substance. To the syrup obtained in the evaporator there were then added, per liter syrup, as conventional, 1 g magnesium sulfate ($MgSO_4 \cdot 7H_2O$) and 0.1 g cobalt sulfate ($CoSO_4 \cdot 7H_2O$) as well as 8.5 GIN (Glucose isomerase Novo SP 103) per gram of glucose as the enzyme. This enzyme is made by the Novo Industry A/S Co. of Denmark. The conversion temperature was 60° C at a pH of 6.6 to 7.5. The pH was maintained constant by means of sodium hydroxide of a concentration of 0.1 to 0.5 mol per liter. The reaction was carried out under an atmosphere of nitrogen as protection against oxidation.

The syrup was then purified by a cation-anion exchange compound and subsequent treatment with activated coal. The conversion obtained was 45 to 50% relative to the initial glucose employed.

As appears, the great advantage of the process of the invention is that it is not necessary to use a purified starch as the starting material for the enzyme treatment. A further advantage is that in none of the described processes are there obtained any substantial amounts of drainage water.

A further advantage is also the recovery of by-products which constitute not ony animal feeds but also top value protein food for human comsumption.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for obtaining dextrose and dextrins from a protein-containing starch product comprising subjecting the starch product to an incomplete or complete acid or enzymatic hydrolysis or a combination of both types of hydrolysis, then circulating the hydrolyzate containing a low viscosity sugar solution and water soluble high molecular proteins through an ultrafilter to separate the proteins from the sugar solution.

and separately recovering the high molecular soluble protein from the filtrate of the ultrafiltration followed by subjecting it to spray-drying to obtain a high protein product useful as human food or animal feed, while recovering the dextrose or, in case of incomplete hydrolysis, the dextrins from the sugar solution obtained as the filter residue.

2. The process of claim 1 wherein the mass while circulating in the ultrafilter is subjected to a waterwash for so long as to cause the protein concentrate formed in the spray drying to have at least 70 to 80% solid contents of dry protein.

3. The process of claim 1 wherein the initial starch product is subjected to a wet grinding step prior to said hydrolysis.

4. The process of claim 1 wherein the ultrafiltration is effected at a pH of 3 to 9 for a time of 15-20 hours at a temperature of 20°-50° C and a pressure of 2-6 bar.

5. The process of claim 1 which includes the step of removing any husks and fat that may have been present from the initial starch product in the hydrolyzate by mechanical separation prior to said ultrafiltration.

6. The process of claim 1 wherein the sugar solution obtained as the filtrate from the ultrafiltration is subjected to a second hydrolysis in the form of an enzymatic hydrolysis followed by said recovery of the dextrose or dextrins which step may further be followed by conversion to isomerose.

7. The process of claim 1 wherein the starch product is a cereal or legume.

8. The process of claim 7 wherein the starch product is constituted by potatoes, arrowroot, manioc (cassava), maize, sorghum, wheat, rice, rye or barley.

9. The process of claim 1 which includes the step of separating out the insoluble residue including the water-insoluble proteins resulting from the hydrolysis by centrifuging or filtering the hydrolyzate prior to said ultrafiltration which insoluble proteins may be recovered for feed purposes.

10. The process of claim 9 wherein the insoluble residue separated out from the hydrolyzate is subjected to an alkaline treatment to further dissolve any residual water-insoluble proteins out of any husks resulting from the initial starch product, followed by separating the formed suspension into a protein-free residue and a protein containing solution, reuniting the protein containing solution with the said hydrolyzate and subjecting it after a neutralizing step to another hydrolysis in form of an enzymatic hydrolysis prior to passing the hydrolyzate through the ultrafilter.

11. The process of claim 9 wherein after the insoluble proteins are removed from said hydrolyzate by filtration and alkali treatment the remaining low viscosity solution is then subjected to a second hydrolysis prior to being passed through the ultrafiltration step.

12. The process of claim 1 wherein the two hydrolysis steps are in the form of enzymatic hydrolyses.

* * * * *